US012083657B2

(12) United States Patent
Schroeder et al.

(10) Patent No.: US 12,083,657 B2
(45) Date of Patent: Sep. 10, 2024

(54) FASTENING TOOL HAVING A MAGNETIC CONTACT TRIP ASSEMBLY

(71) Applicant: Black & Decker Inc., New Britain, CT (US)

(72) Inventors: James D. Schroeder, Dallastown, PA (US); Merrill A. Myers, III, Parkville, MD (US); Dylan Parker, Towson, MD (US); Alex Dignan, Towson, MD (US); Vivekkumar Kumar, Ellicott City, MD (US); Alastair Valentine, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 166 days.

(21) Appl. No.: 17/744,985

(22) Filed: May 16, 2022

(65) Prior Publication Data

US 2022/0410358 A1 Dec. 29, 2022

Related U.S. Application Data

(60) Provisional application No. 63/213,962, filed on Jun. 23, 2021.

(51) Int. Cl.
*B25C 1/00* (2006.01)
*B25C 5/00* (2006.01)

(52) U.S. Cl.
CPC ................ *B25C 1/008* (2013.01); *B25C 5/00* (2013.01)

(58) Field of Classification Search
CPC .............. B25C 1/00; B25C 1/008; B25C 5/00
See application file for complete search history.

(56) References Cited

U.S. PATENT DOCUMENTS

| | | | |
|---|---|---|---|
| 5,732,870 | A | 3/1998 | Moorman et al. |
| 5,918,788 | A | 7/1999 | Moorman et al. |
| 6,382,492 | B1 | 5/2002 | Moorman et al. |
| 6,431,425 | B1 | 8/2002 | Moorman et al. |
| 7,934,565 | B2 | 5/2011 | Krondorfer et al. |

(Continued)

FOREIGN PATENT DOCUMENTS

| | | | |
|---|---|---|---|
| EP | 2444202 | A2 | 4/2012 |
| WO | 2009046076 | A1 | 4/2009 |

OTHER PUBLICATIONS

Extended European Search Report regarding Patent Application No. 221796055, dated Nov. 9, 2022.

*Primary Examiner* — Praachi M Pathak
(74) *Attorney, Agent, or Firm* — Harness, Dickey & Pierce, P.L.C.

(57) ABSTRACT

A fastening tool for driving a fastener into a workpiece is described herein. The fastening tool includes a contact trip, a magnet, and a magnetometer. The contact trip is disposed at a first end of the fastening tool and is configured to move toward a second end of the fastening tool opposite of the first end when the contact trip engages the workpiece. The magnet is configured to generate a magnetic field. The magnet is coupled to the contact trip such that movement of the contact trip causes the magnet to move. The magnetometer is configured to detect a change in the magnetic field generated by the magnet when the magnet moves relative to the magnetometer and, based on the detected change in the magnetic field, to generate a signal indicating when the contact trip engages the workpiece.

19 Claims, 6 Drawing Sheets

(56) References Cited

U.S. PATENT DOCUMENTS

| | | | |
|---|---|---|---|
| 8,011,547 B2 | 9/2011 | Leimbach et al. | |
| 8,042,717 B2 | 10/2011 | Lam et al. | |
| 8,763,874 B2 | 7/2014 | McCardle et al. | |
| 9,381,633 B2 | 7/2016 | Moore et al. | |
| 9,550,288 B2 | 1/2017 | Moore et al. | |
| 9,782,880 B2 | 10/2017 | Moore et al. | |
| 10,213,911 B2 | 2/2019 | Moore et al. | |
| 10,286,533 B2 | 5/2019 | Krout et al. | |
| 2010/0258607 A1* | 10/2010 | Lam | B25C 1/008 227/8 |
| 2013/0320068 A1* | 12/2013 | Gregory | B25C 1/005 227/139 |
| 2015/0096776 A1* | 4/2015 | Garber | B25C 1/00 173/1 |
| 2016/0325420 A1* | 11/2016 | Krout | B25C 1/008 |
| 2019/0184536 A1 | 6/2019 | Moore et al. | |

* cited by examiner

FASTENING TOOL HAVING A MAGNETIC CONTACT TRIP ASSEMBLY

CROSS-REFERENCE TO RELATED APPLICATIONS

This application claims the benefit of U.S. Provisional Application No. 63/213,962, filed on Jun. 23, 2021. The entire disclosure of the application referenced above is incorporated herein by reference.

FIELD

The present disclosure relates in general to fastening tools for driving fasteners such as nails or staples into a workpiece and, more particularly, to fastening tools having a magnetic contact trip assembly.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fastening tool for driving fasteners such as nails or staples into a workpiece typically includes a mechanical contact trip switch that detects when the nosepiece of the fastening tool is pressed against a workpiece. An example of such a mechanical contact trip switch is labelled 10 in FIG. 1. The mechanical contact trip switch 10 includes a metal upper contact trip 12, a contact sensor 14, an override mechanism or mechanical decoupler 16, and a plastic depth adjustment wheel 18. The upper contact trip 12 moves in a rearward direction 20 relative to the nosepiece (not shown) of the fastening tool when a front end 22 of the upper contact trip 12 engages a lower contact trip (not shown), which in turn engages the workpiece. The contact sensor 14 detects movement of the upper contact trip 12 due to engagement with the workpiece when the upper contact trip 12 contacts the contact sensor 14.

The mechanical decoupler 16 decouples the movement and force of the upper contact trip 12 from the contact sensor 14 to prevent damage to the contact sensor 14. In the example shown, the mechanical decoupler 16 includes a plastic housing 24 and a coil spring 26 that is captured between the upper contact trip 12 and the plastic housing 24. In other examples, the mechanical decoupler 16 includes a mechanical override or ramp. The depth adjustment wheel 18 is rotatable to set the distance by which the upper contact trip 12 protrudes from the nosepiece and thereby set the depth to which the fastening tool drive the fastener into the workpiece.

A mechanical contact trip switch in a fastening tool such a nail or staple gun is subject to shock, vibration, and impact and has a high life cycle requirement. Mechanical type switches have reliability limits due to mechanical wear, internal contamination, friction, and fatigue.

SUMMARY

A fastening tool for driving a fastener into a workpiece is described herein. In one example, the fastening tool includes a contact trip, a magnet, and a magnetometer. The contact trip is disposed at a first end of the fastening tool and is configured to move toward a second end of the fastening tool opposite of the first end when the contact trip engages the workpiece. The magnet is configured to generate a magnetic field. The magnet is coupled to the contact trip such that movement of the contact trip causes the magnet to move. The magnetometer is configured to detect a change in the magnetic field generated by the magnet when the magnet moves relative to the magnetometer and, based on the detected change in the magnetic field, to generate a signal indicating when the contact trip engages the workpiece.

In one aspect, the magnetometer is a Hall effect sensor.

In one aspect, the fastening tool further includes a depth adjustment mechanism connected to the contact trip such that movement of the contact trip causes the depth adjustment mechanism to move. The depth adjustment mechanism couples the magnet to the contact trip.

In one aspect, the depth adjustment mechanism includes a first spindle and a second spindle threadedly connected to the first spindle and coaxial with the first spindle. The first and second spindles are configured to translate along a longitudinal axis thereof.

In one aspect, the fastening tool further includes a linkage that couples the magnet to the depth adjustment mechanism and positions the magnet adjacent to the magnetometer.

In one aspect, the magnet is directly coupled to the contact trip.

In one aspect, the fastening tool further includes a linkage that couples the magnet to the contact trip and positions the magnet adjacent to the magnetometer.

In one aspect, the linkage is indirectly coupled to the contact trip.

In one aspect, the linkage is made of plastic and is molded over the magnet.

In one aspect, the magnet is secured within a bore in the linkage using at least one of a snap fit, a press fit, and an adhesive.

In one aspect, the linkage is a unitary body made of metal.

In one aspect, the magnet is disposed within a bore in the linkage and is captured within the bore using a cover that is secured to the linkage using a snap fit.

In one aspect, the magnet has a north pole and a south pole disposed at opposite ends of the magnet along a longitudinal axis thereof, and the longitudinal axis of the magnet is parallel to a direction in which the magnet travels when the contact trip engages the workpiece.

In one aspect, the magnet has a north pole and a south pole disposed at opposite ends of the magnet along a longitudinal axis thereof, and the longitudinal axis of the magnet is perpendicular to a direction in which the magnet travels when the contact trip engages the workpiece.

In one aspect, the fastening tool further includes an actuator and a control module. The control module is configured to receive the signal generated by the magnetometer and, in response to the signal, to control the actuator to drive the fastener into the workpiece.

In one aspect, the control module is configured to control the actuator to drive the fastener into the workpiece based on the change in a polarity of the magnetic field generated by the magnet.

In one aspect, the control module is configured to control the actuator to drive the fastener into the workpiece based on the change in a magnitude of the magnetic field generated by the magnet.

In one aspect, the fastening tool is a nailer.

In one aspect, the magnet is a permanent magnet.

In one aspect, when the contact trip engages the workpiece, the magnet moves from one side of the magnetometer to another side of the magnetometer in a direction extending between the first and second ends of the fastening tool.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 2:
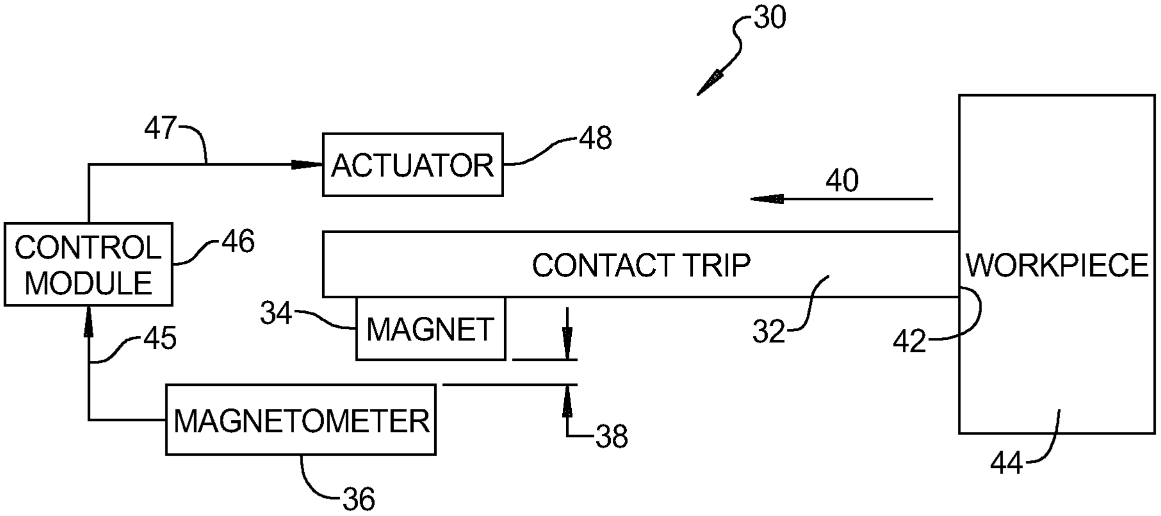
FIG. 2 is a schematic of an example of a magnetic contact trip assembly according to the present disclosure.

A fastening tool according to the present disclosure includes a magnetic contact trip assembly that detects when the nosepiece of the fastening tool is pressed against a workpiece. An example of such a magnetic contact trip assembly is schematically illustrated and labelled 30 in FIG. 2. The magnetic contact trip assembly 30 includes a contact trip 32, a magnet 34 (e.g., a permanent magnet) directly or indirectly coupled to the contact trip 32, and a magnetometer 36 (e.g., a Hall effect sensor) that is spaced apart from the magnet 34 by a gap 38. In the example shown, the magnet 34 is directly coupled to the contact trip 32. In other example, the magnet 34 may be indirectly coupled to the contact trip via a depth adjustment mechanism. The contact trip 32 moves in a rearward direction 40 relative to the nosepiece (not shown) of the fastening tool when a front end 42 of the contact trip 32 engages a workpiece 44.

The magnet 34 generates a magnetic field. The magnetometer 36 detects a change in the magnetic field generated by the magnet 34 when the magnet 34 moves relative to the magnetometer 36. Based on the detected change in the magnetic field, the magnetometer 36 generates an analog or digital signal 45 indicating when the contact trip 32 engages the workpiece 44. A control module 46 receives the signal 45 generated by the magnetometer 36 and, in response to the signal 45, generates a signal 47 to control an actuator 48 (e.g., an electric motor) to drive the fastener into the workpiece 44.

Figure 1:
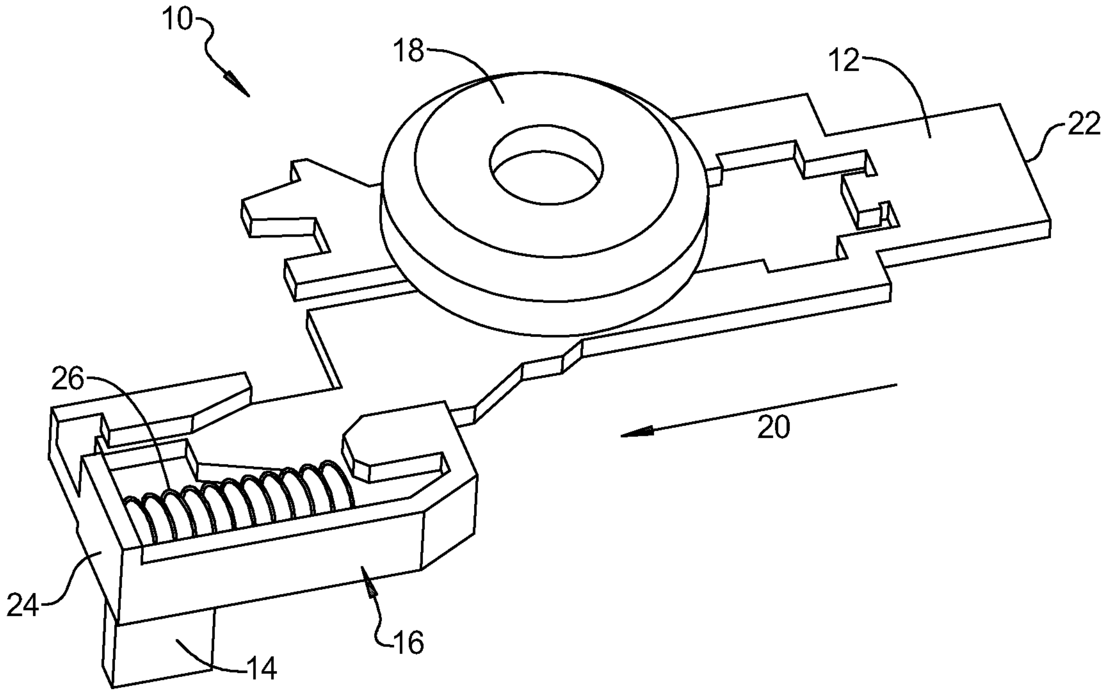
FIG. 1 is a perspective view of an example of a mechanical contact trip switch according to the prior art.

Since the contact trip 32 does not contact the magnetometer 36 as the contact trip 32 moves in the rearward direction 40, the magnetic contact trip assembly 30 does not need to include a mechanical decoupler such as the mechanical decoupler 16 of FIG. 1. Thus, the material and assembly cost of the magnetic contact trip assembly 30 may be less than that of a mechanical contact trip switch such as the mechanical contact trip switch of FIG. 1. In addition, due to the lack of contact between the contact trip 32 and the magnetometer 36, the magnetic contact trip assembly 30 may have improved reliability relative to a mechanical contact trip switch.

Figure 3:
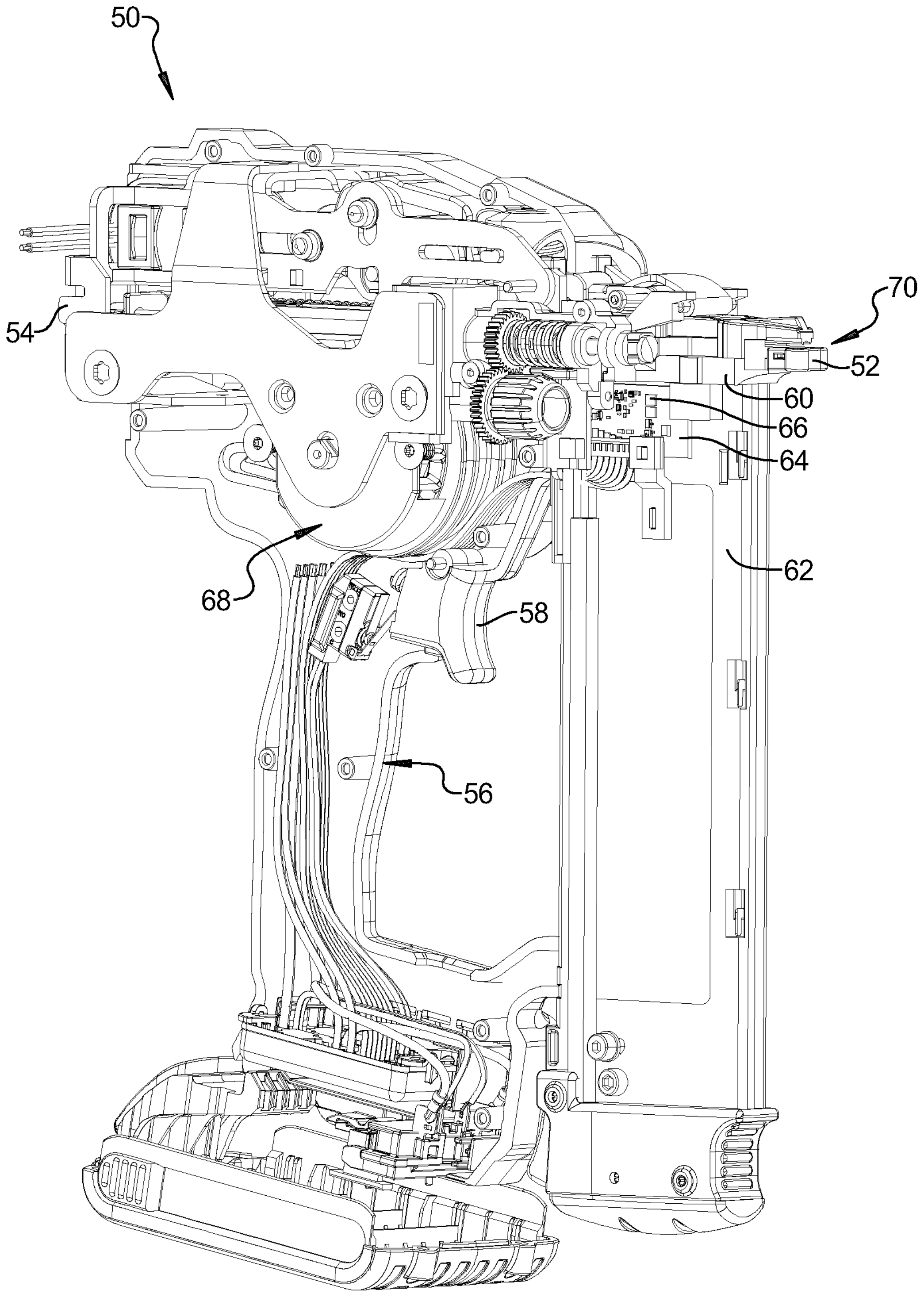
FIG. 3 is a perspective view of an example of a fastening tool including another example of a magnetic contact trip assembly according to the present disclosure.
Figure 4:
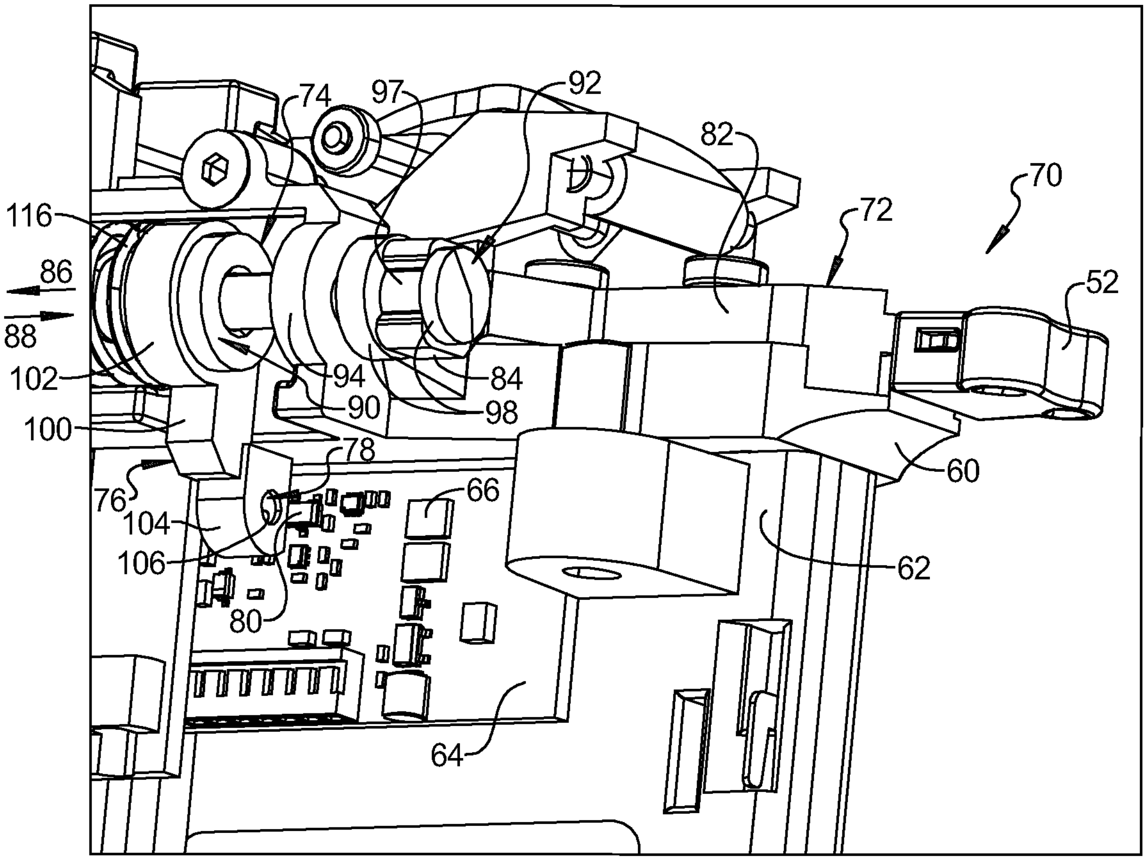
FIG. 4 is an enlarged perspective view of the magnetic contact trip assembly of FIG. 3.
Figure 5:
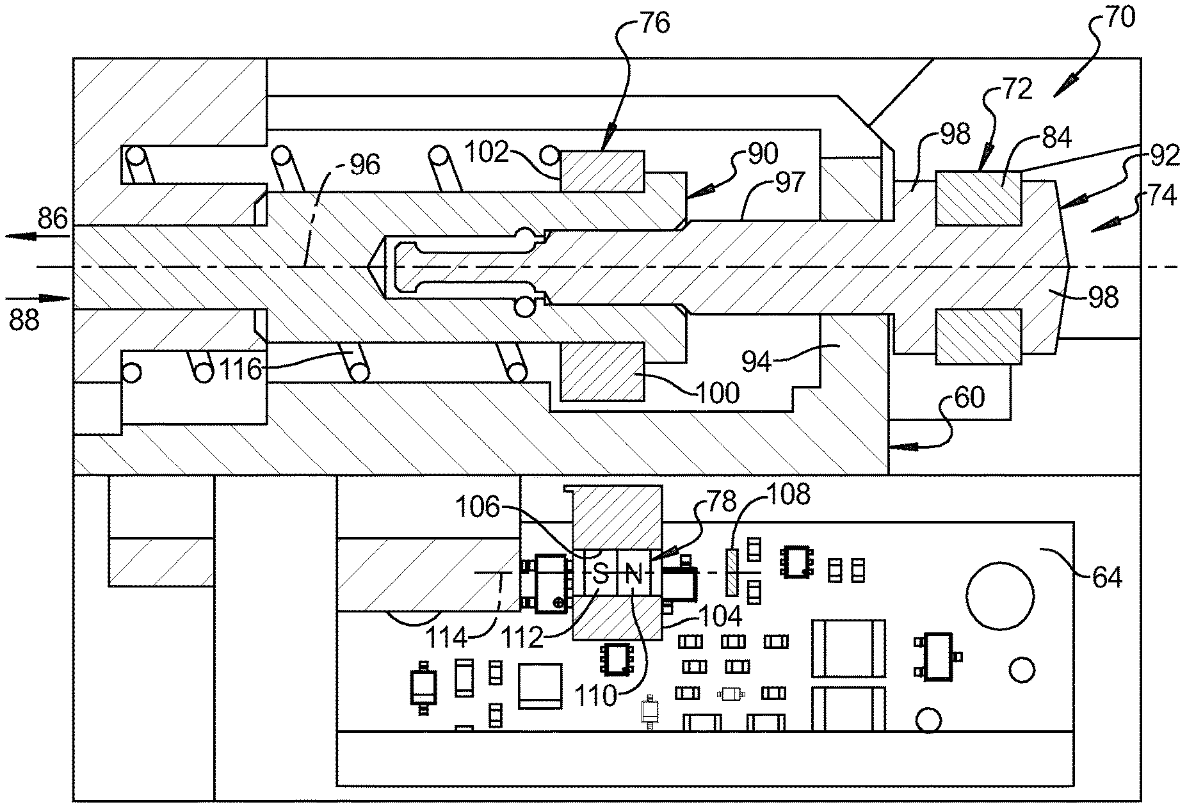
FIG. 5 is a section view of the magnetic contact trip assembly of FIG. 3.

FIGS. 3 through 5 illustrate an example of a fastening tool 50 according to the present disclosure. The fastening tool 50 is operable to drive fasteners such as nails or staples into a workpiece. In the example shown, the fastening tool 50 is a nailer. The fastening tool 50 has a front end 52 and a rear end 54 opposite of the front end 52. The fastening tool 50 includes a housing 56, a trigger 58, a nosepiece 60, a fastener magazine 62, a printed circuit board (PCB) 64, a control module 66, an actuator 68, and a magnetic contact trip assembly 70.

The nosepiece 60 is attached to the housing 56 and forms the front end 52 of the fastening tool 50. The fastener magazine 62 is attached to the housing 56 and/or the nosepiece 60 and is configured to hold a plurality of fasteners (e.g., nails). In the example shown, the PCB 64 is attached to the fastener magazine 62. In other examples, the PCB 64 may be attached to the nosepiece 60 and/or a mount for a depth adjustment mechanism 74. The control module 66 is disposed on the PCB 64 and is configured to control the actuator 68 to drive a fastener from the fastener magazine 62 into a workpiece. The actuator 68 is attached to the housing 56 and may include an electric motor, a flywheel, a power take off, and a nail driving mechanism.

As best shown in FIGS. 4 and 5, the magnetic contact trip assembly 70 includes a contact trip 72, the depth adjustment mechanism 74, a linkage 76, a magnet 78, and a magnetometer 80. The contact trip 72 is made of materials including, but not limited to, plastic and metal. The contact trip 72 includes a main body 82 and a fork 84 protruding from the main body 82. When the main body 82 of the contact trip 72 engages a workpiece, the fork 84 of the contact trip 72 moves in a rearward direction 86 toward the rear end 54 of the fastening tool 50. The contact trip 72 is coupled to the nosepiece 60 in a manner that allows the contact trip 72 to move relative to the nosepiece 60. For example, the contact trip 72 may be coupled to the nosepiece 60 using a bracket and rail coupler (not shown) that allows the contact trip 72 to translate in the rearward direction 86 and in a forward direction 88 opposite of the rearward direction 86.

The depth adjustment mechanism 74 is coupled to the nosepiece 60 in a manner that allows the depth adjustment mechanism 74 to translate relative to the nosepiece 60. In addition, the depth adjustment mechanism 74 is connected to the contact trip 72 such that movement of the contact trip 72 causes the depth adjustment mechanism 74 to move. The depth adjustment mechanism 74 can be made of a material including, but not limited to, metal. The depth adjustment mechanism 74 includes a first spindle 90 and a second spindle 92 threadedly connected to the first spindle 90 and coaxial with the first spindle 90. The nosepiece 60 forms a bearing 94 that supports the second spindle 92 while allowing the second spindle 92 to translate relative to the nosepiece 60. The first and second spindles 90 and 92 are translatable along a longitudinal axis 96 thereof in the rearward and forward directions 86 and 88.

The fork 84 of the contact trip 72 receives a cylindrical body 97 of the second spindle 92 and is captured between disks 98 that protrude radially outward from the cylindrical body 97. The second spindle 92 can be unthreaded out of the first spindle 90 to increase the distance by which the contact trip 72 protrudes from the fastening tool 50 and thereby decrease the depth at which the fastening tool 50 drives the fastener into the workpiece. Conversely, the second spindle 92 can be threaded into the first spindle 90 to decrease the distance by which the contact trip 72 protrudes from the fastening tool 50 and thereby increase the depth at which the fastening tool 50 drives the fastener into the workpiece.

The linkage 76 couples the magnet 78 to the depth adjustment mechanism 74 and positions the magnet 78 adjacent to the magnetometer 80 while providing a gap 99 (FIG. 7) therebetween. In the example shown, the linkage 76 is indirectly coupled to the contact trip 72 via the depth adjustment mechanism 74. In other examples, the linkage 76 may be directly coupled to the contact trip 72. Also, in the example shown, the linkage 76 is spaced apart from the part holding the magnetometer 80 (e.g., the nosepiece 60 or the fastener magazine 62). In other examples, the part holding the magnetometer 80 may define a slot through which the linkage 76 is guided. The linkage 76 may be a unitary body or multiple pieces connected to one another. The linkage 76 may be injection molded from plastic or stamped from (sheet) metal. In various implementations, the linkage 76 and/or the magnet 78 may be arranged coaxial with the first and second spindles 90 and 92. For example, the magnet 78 may have a hole or orifice through which the first spindle 90 and/or the second spindle 92 pass(es) through.

The linkage 76 includes a connecting portion 100, an annular portion 102 attached to one end of the connecting portion 100, and a magnet holding portion 104 attached to the other end of the connecting portion 100. As shown in FIG. 4, the connecting portion 100 of the linkage 76 may be rectangular and the magnet holding portion 104 of the linkage 76 may be U-shaped. The annular portion 102 of the linkage 76 extends around the first spindle 90 of the depth adjustment mechanism 74 and may be secured thereto using a press fit and/or adhesive, and/or by injection molding the linkage 76 over the first spindle 90. The magnet holding portion 104 of the linkage 76 defines a bore 106 in which the magnet 78 is disposed.

The linkage 76 may be made of plastic and (injection) molded over the magnet 78 to form the bore 106 and to secure the magnet 78 within the bore 106. Alternatively, the magnet 78 may be secured within the bore 106 in the linkage 76 using one or more of a snap fit, a press fit, and an adhesive. Additionally or alternatively, the magnet 78 may be captured within the bore 106 using a cover 108 (shown exploded in FIG. 5) that is secured to the linkage 76 using a snap fit. The cover 108 may be disk shaped and may fit within the bore 106. The cover 108 may be secured to the linkage 76 to close the bore 106 on one side of the magnet 78, and a similar or identical cover may be secured to the linkage 76 to close the bore 106 on the other side of the magnet 78. Alternatively, the bore 106 may be a blind bore and the cover 108 may be secured to the linkage 76 to close the bore 106 after the magnet 78 is inserted into the bore 106.

The magnet 78 generates a magnetic field and may be a permanent magnet. The magnet 78 is coupled to the contact trip 72 such that movement of the contact trip 72 causes the magnet 78 to move. The magnet 78 may move the same distance as the contact trip 72. In the example shown, the magnet 78 is coupled to the contact trip 72 via the linkage 76 and the depth adjustment mechanism 74. As shown in FIG. 5, the magnet 78 has a north pole 110 and a south pole 112 disposed at opposite ends of the magnet 78 along a longitudinal axis 114 thereof. The longitudinal axis 114 of the magnet 78 is parallel to the rearward direction 86 in which the magnet 78 travels when the contact trip 72 engages the workpiece.

The magnetometer 80 detects a change in the magnetic field generated by the magnet 78 when the magnet 78 moves relative to the magnetometer 80. Based on the detected change in the magnetic field, the magnetometer 80 generates a signal indicating when the contact trip 72 engages the workpiece. The magnetometer 80 may be a Hall effect sensor. In the example shown, the magnetometer 80 is coupled to the fastener magazine 62 via the PCB 64. In other examples, the magnetometer 80 may be directly or indirectly coupled to the nosepiece 60. The control module 66 receives the signal generated by the magnetometer 36 and, in response to the signal, controls the actuator 68 to drive the fastener into the workpiece 44. In various implementations, the control module 66 may refrain from controlling the actuator 68 to drive the fastener into the workpiece 44 unless the control module 66 receives both the signal indicating that the contact trip 72 is engaging the workpiece and a signal indicating that the trigger 58 is depressed.

When the contact trip 72 engages the workpiece, the magnet 78 moves in the rearward direction 86 from one side of the magnetometer 80 to the other side of the magnetometer 80. As this occurs, the polarity of the magnetic field generated by the magnet 78 and detected by the magnetometer 80 changes from positive to negative or vice versa. Thus, the control module 66 may control the actuator 68 to drive the fastener into the workpiece when the polarity of the magnetic field generated by the magnet 78 and detected by the magnetometer 80 changes from positive to negative or vice versa. Additionally or alternatively, the control module 66 may control the actuator 68 to drive the fastener into the workpiece when a change in the magnitude of the magnetic field generated by the magnet 78 and detected by the magnetometer 80 is greater than a threshold.

When the nosepiece 60 of the fastening tool 50 is moved away from the workpiece, the contact trip 72, the depth adjustment mechanism 74, and the linkage 76 are allowed to return to their original positions (i.e., their positions before the contact trip 72 engaged the workpiece). In the example shown, the contact trip 72, the depth adjustment mechanism 74, and the linkage 76 are biased toward the front end 52 of the fastening tool 50 by a spring 116 that is captured between the nosepiece 60 and the linkage 76. Thus, when the nosepiece 60 of the fastening tool 50 is moved away from the workpiece, the spring returns the contact trip 72, the depth adjustment mechanism 74, and the linkage 76 to their original positions.

Figure 6:
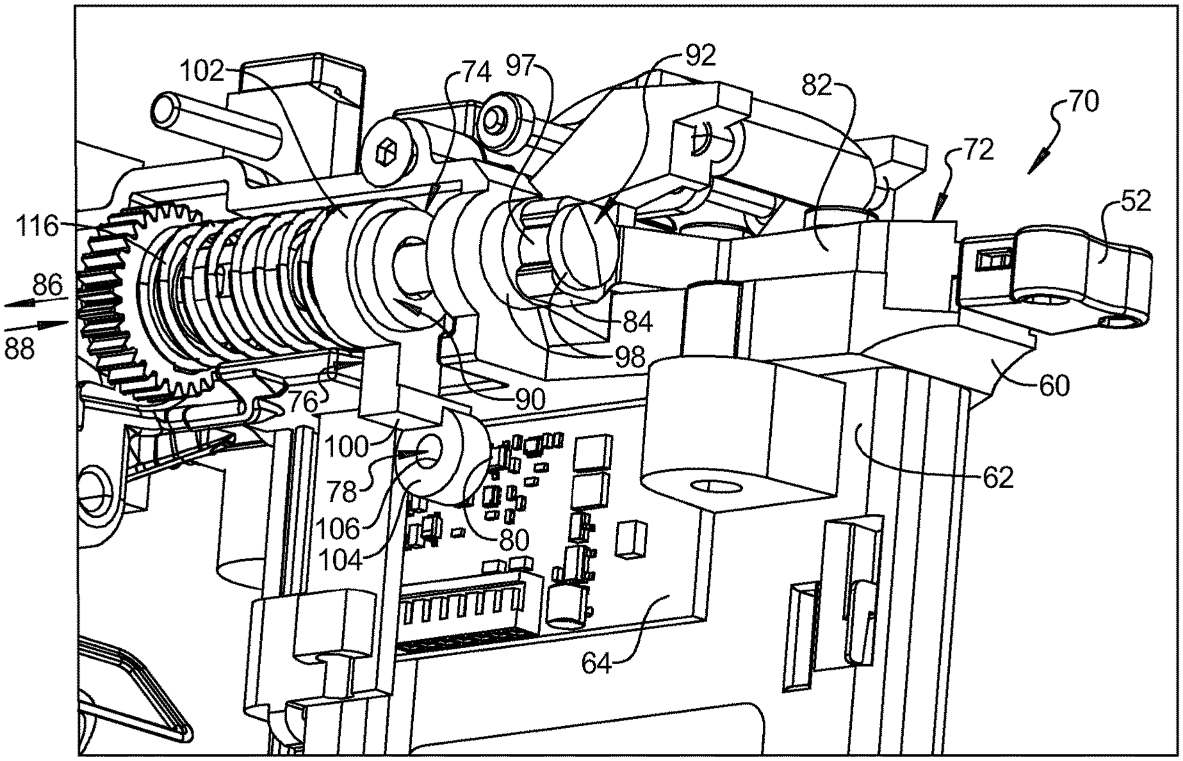
FIG. 6 is a perspective view of another example of a magnetic contact trip assembly according to the present disclosure.
Figure 7:
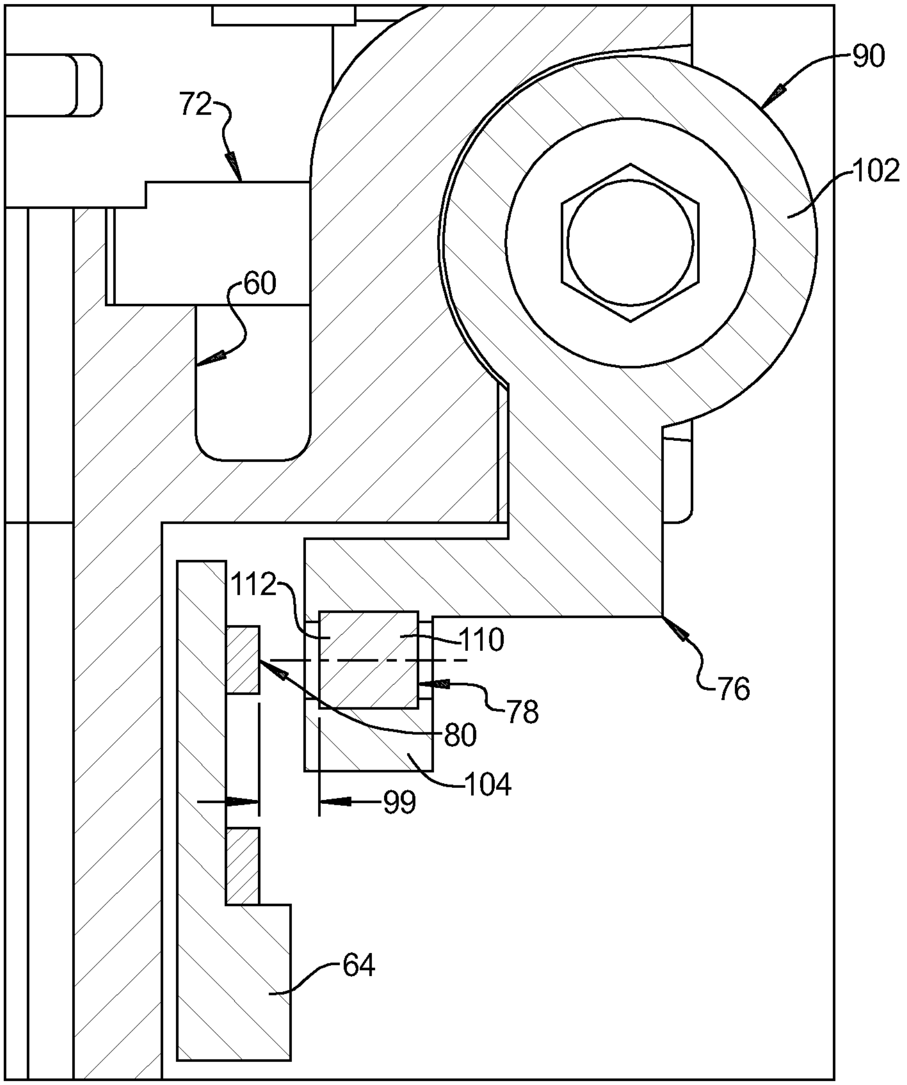
FIG. 7 is a section view of the magnetic contact trip assembly of FIG. 6.

FIGS. 6 and 7 show an alternative embodiment of the fastening tool 50 in which the longitudinal axis 114 of the magnet 78 is perpendicular to the rearward direction 86 in which the magnet 78 travels when the contact trip 72 engages the workpiece. Thus, when the magnet 78 moves in the rearward direction 86 from one side of the magnetometer 80 to the other side thereof, the polarity of the magnetic field generated by the magnet 78 and detected by the magnetometer 80 does not change. However, when this occurs, the magnitude of the magnetic field generated by the magnet 78 and detected by the magnetometer 80 changes. Thus, the control module 66 may control the actuator 68 to drive the fastener into the workpiece when a change in the magnitude of the magnetic field generated by the magnet 78 and detected by the magnetometer 80 is greater than a threshold. Additionally or alternatively, the control module 66 may control the actuator 68 to drive the fastener into the workpiece when the magnetometer 80 does or does not detect the magnetic field generated by the magnet 78. Furthermore, the magnet holding portion 104 of the linkage 76 may be annular as shown in FIG. 6 instead of U-shaped as shown in FIG. 4.

In any of the examples described above, the magnetometer 80 may include one or more Hall effect sensors or other types of magnetometers. Alternatively, the magnetometer 80 may be replaced with a magnetoresistor or magnetoresistive sensor. Broadly, the magnetometer 80 may be replaced with another type of sensor that can detect a change in the magnetic field or flux and has an output that can serve as a basis for controlling the actuator 68. Even more broadly, the magnetometer 80 may be replaced with another type of sensor that detects a change in characteristic of a sensor target.

Hall effect sensors that can be used include a bipolar Hall effect sensor, a linear Hall effect sensor, a discrete Hall effect sensor, and a magnetoresistive Hall effect sensor. Hall effect sensors that do or do not have built-in amplifiers can be used. The Hall effect sensor can be oriented relative to the magnet 78 such that when the magnetic field of the magnet 78 is disrupted by a ferrous part, the flux detected by the Hall effect sensor changes polarity. This change in the polarity of the flux causes the sensor to change the signal it sends to the control module 66, indicating that the fastening tool 50 is pressed against the workpiece.

Magnets and Hall effect sensors could be incorporated into the fastening tool 50 at a variety of locations that allow movement of the magnets relative to the sensors. This disclosure is not limited in regard to a means to place or fix the magnets for detection by the Hall effect sensors. A magnet can be affixed to a component of the fastening tool 50 and/or to tool potting.

The magnets can be configured at various distances and in a number of configurations in relation to the Hall effect sensors. One magnet or a number of magnets can be used to provide input to the Hall effect sensor. Magnets of different strengths and different polarities can be used.

In any of the examples described above, the magnet 78 may include N35 magnets and/or N35SH magnets. Alternatively, the magnet 78 may include other types of magnets such as Neodymium Iron Boron magnets. Additionally, the magnet 78 may include magnetic sources that are not permanent magnets such as magnetized plastics, or magnetically infused plastics (e.g. slider having magnetized portions, magnetized elements, magnetized components, or magnetized plastic portions).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A fastening tool for driving a fastener into a workpiece, the fastening tool comprising:
- a contact trip disposed at a first end of the fastening tool and configured to move toward a second end of the fastening tool opposite of the first end when the contact trip engages the workpiece;
- a magnet configured to generate a magnetic field, wherein the magnet is coupled to the contact trip such that movement of the contact trip causes the magnet to move;
- a magnetometer configured to:
  - detect a change in the magnetic field generated by the magnet when the magnet moves relative to the magnetometer; and
  - based on the detected change in the magnetic field, generate a signal indicating when the contact trip engages the workpiece; and
- a depth adjustment mechanism connected to the contact trip such that movement of the contact trip causes the depth adjustment mechanism to move, the depth adjustment mechanism coupling the magnet to the contact trip.

2. The fastening tool of claim 1 wherein the magnetometer is a Hall effect sensor.

3. The fastening tool of claim 1 wherein the depth adjustment mechanism includes a first spindle and a second spindle threadedly connected to the first spindle and coaxial with the first spindle, wherein the first and second spindles are configured to translate along a longitudinal axis thereof.

4. The fastening tool of claim 1 further comprising a linkage that couples the magnet to the depth adjustment mechanism and positions the magnet adjacent to the magnetometer.

5. A fastening tool for driving a fastener into a workpiece, the fastening tool comprising:
- a contact trip disposed at a first end of the fastening tool and configured to move toward a second end of the fastening tool opposite of the first end when the contact trip engages the workpiece;
- a magnet configured to generate a magnetic field, wherein the magnet is coupled to the contact trip such that movement of the contact trip causes the magnet to move;
- a magnetometer configured to:
  - detect a change in the magnetic field generated by the magnet when the magnet moves relative to the magnetometer; and based on the detected change in the magnetic field, generate a signal indicating when the contact trip engages the workpiece; and a linkage that couples the magnet to the contact trip and positions the magnet adjacent to the magnetometer.

6. The fastening tool of claim 5 wherein the linkage is indirectly coupled to the contact trip.

7. The fastening tool of claim 5 wherein the linkage is made of plastic and is molded over the magnet.

8. The fastening tool of claim 5 wherein the magnet is secured within a bore in the linkage using at least one of a snap fit, a press fit, and an adhesive.

9. The fastening tool of claim 5 wherein the linkage is a unitary body made of metal.

10. The fastening tool of claim 5 wherein the magnet is disposed within a bore in the linkage and is captured within the bore using a cover that is secured to the linkage using a snap fit.

11. The fastening tool of claim 5 wherein the magnet has a north pole and a south pole disposed at opposite ends of the magnet along a longitudinal axis thereof, and the longitudinal axis of the magnet is parallel to a direction in which the magnet travels when the contact trip engages the workpiece.

12. The fastening tool of claim 5 further comprising:

an actuator; and a control module configured to receive the signal generated by the magnetometer and, in response to the signal, to control the actuator to drive the fastener into the workpiece.

13. The fastening tool of claim 5 wherein the fastening tool is a nailer.

14. The fastening tool of claim 5 wherein the magnet is a permanent magnet.

15. A fastening tool for driving a fastener into a workpiece, the fastening tool comprising:

a contact trip disposed at a first end of the fastening tool and configured to move toward a second end of the fastening tool opposite of the first end when the contact trip engages the workpiece;

a magnet configured to generate a magnetic field, wherein the magnet is coupled to the contact trip such that movement of the contact trip causes the magnet to move; and a magnetometer configured to:

detect a change in the magnetic field generated by the magnet when the magnet moves relative to the magnetometer; and based on the detected change in the magnetic field, generate a signal indicating when the contact trip engages the workpiece, wherein the magnet has a north pole and a south pole disposed at opposite ends of the magnet along a longitudinal axis thereof, and the longitudinal axis of the magnet is perpendicular to a direction in which the magnet travels when the contact trip engages the workpiece.

16. A fastening tool for driving a fastener into a workpiece, the fastening tool comprising:

a contact trip disposed at a first end of the fastening tool and configured to move toward a second end of the fastening tool opposite of the first end when the contact trip engages the workpiece;

a magnet configured to generate a magnetic field, wherein the magnet is coupled to the contact trip such that movement of the contact trip causes the magnet to move;

a magnetometer configured to:

detect a change in the magnetic field generated by the magnet when the magnet moves relative to the magnetometer; and based on the detected change in the magnetic field, generate a signal indicating when the contact trip engages the workpiece;

an actuator; and a control module configured to receive the signal generated by the magnetometer and, in response to the signal, to control the actuator to drive the fastener into the workpiece, wherein the control module is configured to control the actuator to drive the fastener into the workpiece based on the change in a polarity of the magnetic field generated by the magnet.

17. The fastening tool of claim 16 wherein the magnet is directly coupled to the contact trip.

18. The fastening tool of claim 16 wherein the control module is configured to control the actuator to drive the fastener into the workpiece based on the change in a magnitude of the magnetic field generated by the magnet.

19. The fastening tool of claim 16 wherein, when the contact trip engages the workpiece, the magnet moves from one side of the magnetometer to another side of the magnetometer in a direction extending between the first and second ends of the fastening tool.

* * * * *